July 30, 1963    F. W. KELLEY, JR    3,099,828
PROTECTIVE CIRCUITRY AND INDICATING MEANS FOR RECTIFIER SYSTEMS
Filed July 17, 1958    2 Sheets-Sheet 1

INVENTOR.
Fred W. Kelley, Jr.
BY *Robert J. Rick*
His Attorney

INVENTOR.
Fred W. Kelley, Jr.

United States Patent Office 3,099,828
Patented July 30, 1963

3,099,828
PROTECTIVE CIRCUITRY AND INDICATING
MEANS FOR RECTIFIER SYSTEMS
Fred W. Kelley, Jr., Lynchburg, Va., assignor to General
Electric Company, a corporation of New York
Filed July 17, 1958, Ser. No. 749,176
14 Claims. (Cl. 340—248)

My invention relates to rectifier systems which normally operate at a high voltage and more particularly to protective circuitry and indicating means for such rectifier systems.

In many large rectifier installations, a great number of rectifying legs are individually fused and are connected in parallel to form a rectifier bank. The rectifier banks may be individually used, as in a single phase half-wave rectifying system, or they may be used in multiple, as in a single-phase full-wave system or a polyphase system wherein each rectifier bank is connected to one of the phase legs. Since many of the large rectifier installations operate at a high voltage, it is often necessary that each rectifier leg consist of a number of rectifier cells in series in order to adequately handle the high inverse voltage developed across the rectifier leg. The usual failure of a rectifier cell is in the form of a short circuit across the cell which consequently results in a higher inverse voltage being developed across each of the remaining rectifier cells in the leg. In order to prevent the failurte of the remaining cells, suitable protective circuitry is necessary so that the failure of one or more rectifier cells may be noted and the rectifier leg disconnected to allow replacement of the defective cell.

In some prior forms of protective circuitry, sensing relays are used to indicate the failure of one of the rectifier cells in a rectifier leg. In one form of installation, each sensing relay includes the control coils each of which is connected across a different rectifier cell in the rectifier leg. The coils are connected so as to act in opposition to each other in order to cancel out each other's effect on the relay when both rectifier cells are in good operating order. Upon failure of one of the rectifier cells, its corresponding coil becomes shorted out and the remaining coil then picks up the relay in order to give an indication that a cell has failed. This arrangement has not proved to be completely reliable due to the fact that the inverse impedances of the individual rectifier cells are often found to vary considerably from sell to cell for normal manufacturing tolerances. This leads to imperfect operation of the relays since the voltage across one coil is often sufficiently different from the voltage across the other coil to cause the relay to pick up and give an erroneous indication. Additionally, the cost of each of the sensing relays is significant and since the great number of them must be used in a large rectifying system the expense involved becomes almost prohibitive.

Accordingly, one object of my invention is to provide improved protective circuitry and indicating means for a rectifier system.

A further object of my invention is to provide improved means for indicating the failure of a rectifier cell in a rectifier leg.

Another object of my invention is to provide an improved arrangement for remotely indicating the failure of a rectifier cell in a rectifier leg.

A further object of my invention is to provide means for also indicating that a fuse has blown in the rectifier leg.

Further objects and advantages of my invention will become apparent as the following description proceeds.

Briefly stated, in accordance with one embodiment of my invention, I provide circuit means for impressing a voltage across each rectifier cell in opposition to and of less potential than the inverse voltage normally appearing across the rectifier cell. Rectifiers are provided for blocking the flow of current through the circuit means during normal operation and yet allowing a current to flow when, due to the shorting of a cell, the impressed voltage across a cell exceeds the inverse voltage acros the cell. An impedance, whose value is changed upon a flow of current through the circuit means, is included, and an indicating means is associated with the impedance to effect an indication of a failed cell when the value of the impedance changes.

While the specification concludes with claims particularly pointing out and distinctly claiming the subject matter which I regard as my invention, it is believed that my invention will be better understood from the following description taken in connection with the accompanying drawings in which:

Figure 1:
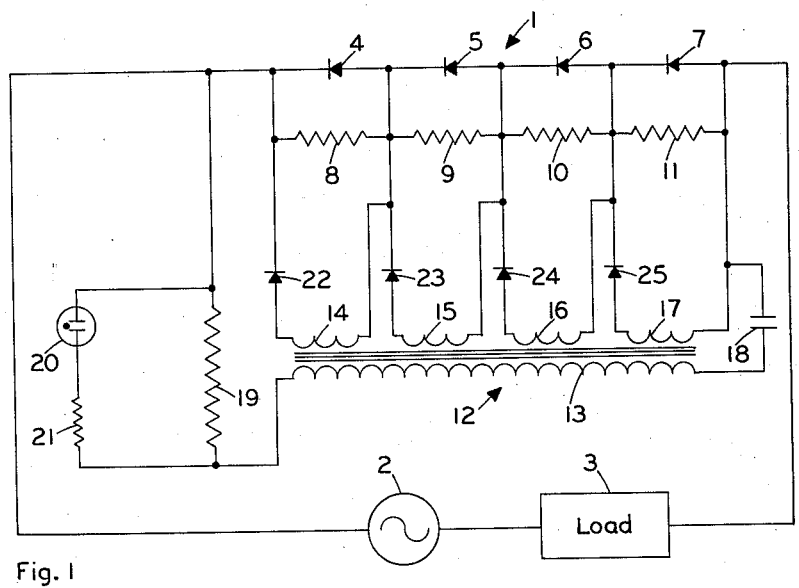
FIGURE 1 is a schematic wiring diagram showing an embodiment of my invention incorporated with a rectifier leg.

The rectifier system of FIGURE 1 comprises a rectifier leg, shown generally at 1, an A.C. voltage source 2 in series with the rectifier leg, and a load 3 in series with both the rectifier leg and the A.C. source. While I have shown only one rectifier leg in this rectifier system, it should be understood that a plurality of rectifier legs may be used in parallel to achieve the necessary current rating. It is further apparent that in place of the single phase half-wave rectifier system shown, a polyphase full-wave rectifier system, or other variation of a rectifier system, may be used and this would still be within the concept of my invention.

As shown in FIGURE 1, rectifying leg 1 includes a plurality of rectifier cells 4, 5, 6, and 7, connected in series in order to distribute the high inverse voltages developed across the leg. In actual practice, the inverse impedance of each cell in a group of rectifier cells in series may vary considerably so that it often is necessary to provide means for balancing the various inverse impedances to more evenly distribute the inverse voltage amongst the cells. In order to accomplish this, a plurality of balancing resistors 8, 9, 10, and 11, which are preferably of equal value, are each connected in parallel with their corresponding rectifier cells 4–7, respectively. It is apparent that should rectifier cells 4–7 be selected and matched so as to have substantially equal inverse impedances, the necessity for balancing resistors 8–11 would be obviated; however, this normally would prove to be a costly procedure and the balancing resistors should preferably be included.

My invention incorporates circuitry which will energize an indicating means when the ratio of the inverse voltage of any rectifier cell to the inverse voltage of the rectifier leg departs from a predetermined minimum value, the minimum value being chosen so as to compensate for individual variations due to manufacturing differences. In order to provide means for sensing and comparing the inverse voltage developed across the rectifier leg with the inverse voltages developed across the rectifier cells, a transformer, shown generally at 12, is provided. Transformer 12 includes a primary winding 13 and a plurality of secondary windings 14–17. One side of primary winding 13 is connected through a capacitor 18 to one side of rectifier leg 1. The opposite side of primary winding 13 is connected through a resistor 19 to the other side of rectifier leg 1 to form a completed A.C. circuit across the rectifier leg. Capacitor 18 is chosen so as to block the flow of D.C. through the primary winding of the transformer and yet provide a low impedance to the flow of A.C. through this circuit.

It is apparent that the inverse voltage developed across the rectifier leg will be impressed across the primary winding A.C. circuit and will be, essentially, divided between the primary winding and its series resistor. It is also obvious that should the impedance of transformer primary winding 13 change, the voltage drop across the primary winding will change in one direction and, consequently, the voltage drop across series resistor 19 will change in the opposite direction since the effective voltage across the entire series A.C. circuit does not vary.

In order to utilize the change in voltage across series resistor 19 to activate an indicating means, neon indicating lamp 20 and its current limiting resistor 21 are shunted across the series resistor 19. Under normal operating conditions, when the rectifier cells 4–7 are in good operating order, the voltage across series resistor 19 will be below the firing voltage of neon indicating lamp 20; however, when a rectifier cell shorts, the voltage across the primary winding 13 will decrease due to a lowering of the impedance of this winding in a manner to be more fully described hereinafter. In consequence of this, the voltage across series resistor 19 will increase to a value greater than that required to fire the indicating lamp and, as a result, the lamp will give an indication of a shorted rectifier cell. It is apparent that various other means may be used to sense the voltage change across series resistor 19 to give an indication that a cell has shorted. A relay arranged to energize an alarm or trip the supply circuit to the rectifier system could be used in place of the neon indicating lamp 20. Such a relay would be one in which the voltage across series resistor 19 under normal conditions would be insufficient to energize it, but which would be energized by the higher voltage existing when a rectifier cell has shorted.

In order to sense that a rectifier cell has shorted and, in consequence of the shorting, has changed the values of the voltages existing across primary winding 13 and series resistor 19, each of the secondary windings 14–17 of transformer 12 is connected through its corresponding blocking rectifier 22–25 to its corresponding rectifier cell 4–7, respectively. The turns ratio between the primary winding 13 and each of the various secondary windings 14–17 is chosen so that the voltage induced in each secondary winding as a result of the A.C. voltage impressed across the primary winding 13 will be lower than the inverse voltage appearing across each corresponding rectifier cell when the cell is in good operating order. This is done to insure that each secondary winding will effectively sense a substantially "open circuit" across its winding and reflect this condition back into the primary winding of the transformer when the rectifier cells are in good condition.

The blocking rectifiers 22–25 will normally have no current flowing through them during either the conducting or the blocking half cycle of the rectifier leg 1. During the conducting half cycle of the rectifier leg, the blocking rectifiers are non-conductive since they are polarized in opposition to the voltages developed in the secondary windings during this part of the cycle and these voltages exceed the forward voltage drops of their corresponding rectifier cells. During the blocking half cycle of the rectifier leg, although the blocking rectifiers are polarized so as to allow current flow through the secondary windings at this time, current may flow only if the voltage across the particular secondary winding exceeds the inverse voltage developed across its corresponding rectifier cell. Since, during normal operation, the voltage across each secondary winding will be lower than the inverse voltage of its corresponding rectifier cell in an amount dependent upon the turns ratio between the primary and secondary windings of the transformer, no current flow will take place in the secondary windings and the transformer primary winding 13 will present a high impedance to the flow of current in the primary winding circuit. This results in a relatively high voltage drop across the primary winding and a corresponding relatively low voltage existing across series resistor 19.

The condition of operation of the protective circuitry and indicating means may be summarized as follows. During normal operation the primary winding A.C. circuit, comprising primary winding 13, series resistor 19, and capacitor 18, has an A.C. voltage impressed across it which corresponds to the inverse voltage existing across rectifier leg 1; the voltage drops across primary winding 13 and its series resistor 19 are such that the indicating lamp 20 will not fire; and each of the secondary winding 14–17 effectively reflects an open circuit condition into the primary winding 13. In this situation the ratios of the inverse voltage of each rectifier cell to the inverse voltage of the rectifier leg are all above a predetermined value and the circuitry senses this condition.

Upon the failure of a rectifier cell, in this case assuming that rectifier cell 4 becomes shorted, it is apparent that the voltage induced in secondary winding 14 will then cause a current to flow through this winding on alternate half cycles when the rectifier leg 1 is in its blocking condition. This results in a lowering of the impedance of primary winding 13 in the transformer primary winding A.C. circuit. In consequence of the lower impedance of primary winding 13, the voltage drop across series resistor 19 increases to the point where neon indicating lamp 20 fires and an indication of a shorted rectifier cell is given. In this situation, one of the ratios of cell inverse voltage to leg inverse voltage has fallen below the predetermined value and the circuitry senses this condition.

Thus, by utilizing my invention, an improved arrangement for protecting a rectifier system and indicating the failure of a rectifier cell is achieved.

Figure 2:
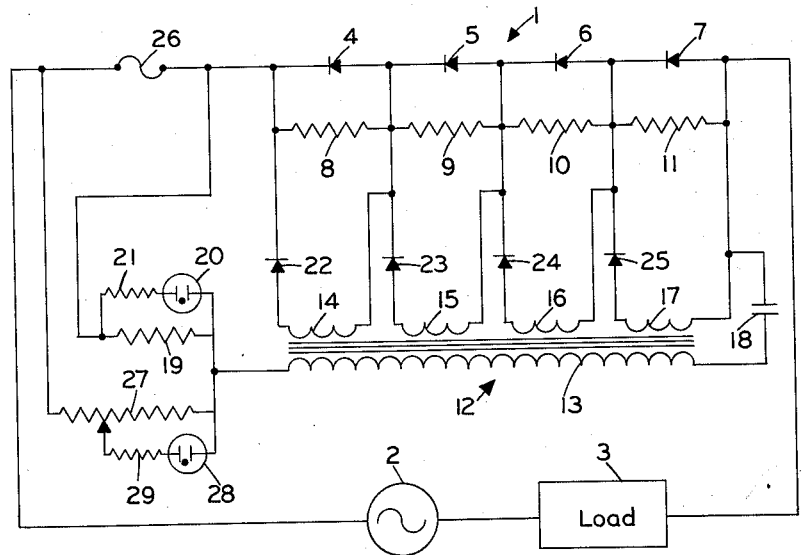
FIGURE 2 is a schematic wiring diagram showing a different embodiment of my invention incorporated with a rectifier leg.

In the embodiment shown in FIGURE 2, a fuse 26 has been added in series with the rectifier cells of rectifier leg 1. In addition, a second sensing and indicating circuit comprising potentiometer 27, partially shunted by neon indicating lamp 28 which is in series with current limiting resistor 29, has been added to the components discussed in the FIGURE 1 embodiment in order to provide means for indicating the condition of fuse 26. The numbering system used in FIGURE 1 has been preserved in FIGURE 2 wherein components which are the same as those in FIGURE 1 have similar numerals assigned to them.

During normal operation, with no rectifier cells shorted, the operation of the circuit in FIGURE 2 will be similar to that of FIGURE 1; however, should a rectifier cell fail, the firing of indicating lamps 20 and 28 becomes dependent in some measure upon whether or not fuse 26 has blown. In order to insure that indicating lamp 20 will be lit at all times where a rectifier cell has failed and the fuse 26 is in good condition, the indicating lamp 28, which is similar to indicating lamp 20, and its current limiting resistor 29 are shunted across a portion of potentiometer 27. With this arrangement it is apparent that the potentiometer may be adjusted so that indicating lamp 28 will require a slightly higher voltage to exist across the parallel combination of resistor 19 and potentiometer 27 before it fires than does indicating lamp 20. This insures that lamp 20 will be energized at all times when a rectifier cell has shorted and fuse 26 is in good condition. Alternatively, instead of using potentiometer 27 to cause indicating lamp 28 to fire at a higher voltage, neon indicating lamp 28 may be chosen so that its initial firing voltage is higher than that of indicating lamp 20. It would then be connected across a resistor rather than the potentiometer 27 in order to achieve the same result of a positive firing of indicating lamp 20 when a rectifier cell has shorted and the fuse 26 is in good condition.

It is possible that indicating lamp 28 may fire, in addition to lamp 20, when fuse 26 is in good condition since the voltage developed across both lamps may be high enough to fire both lamps during the time it takes lamp 20 to fire; however, in the event that fuse 26 blows, it is apparent that the A.C. circuit through primary winding 13 can no longer be maintained through indicating lamp 20 and therefore this lamp will be de-energized and only indicating lamp 28 will remain lit. In this embodiment, therefore, it is apparent that should either lamp 20, or both lamps 20 and 28 be lit, it would be indicative of the fact that fuse 26 is in good operating order; however should only lamp 28 be lit and lamp 20 be extinguished it would be indicative of the fact that the fuse 26 has blown.

Figure 3:
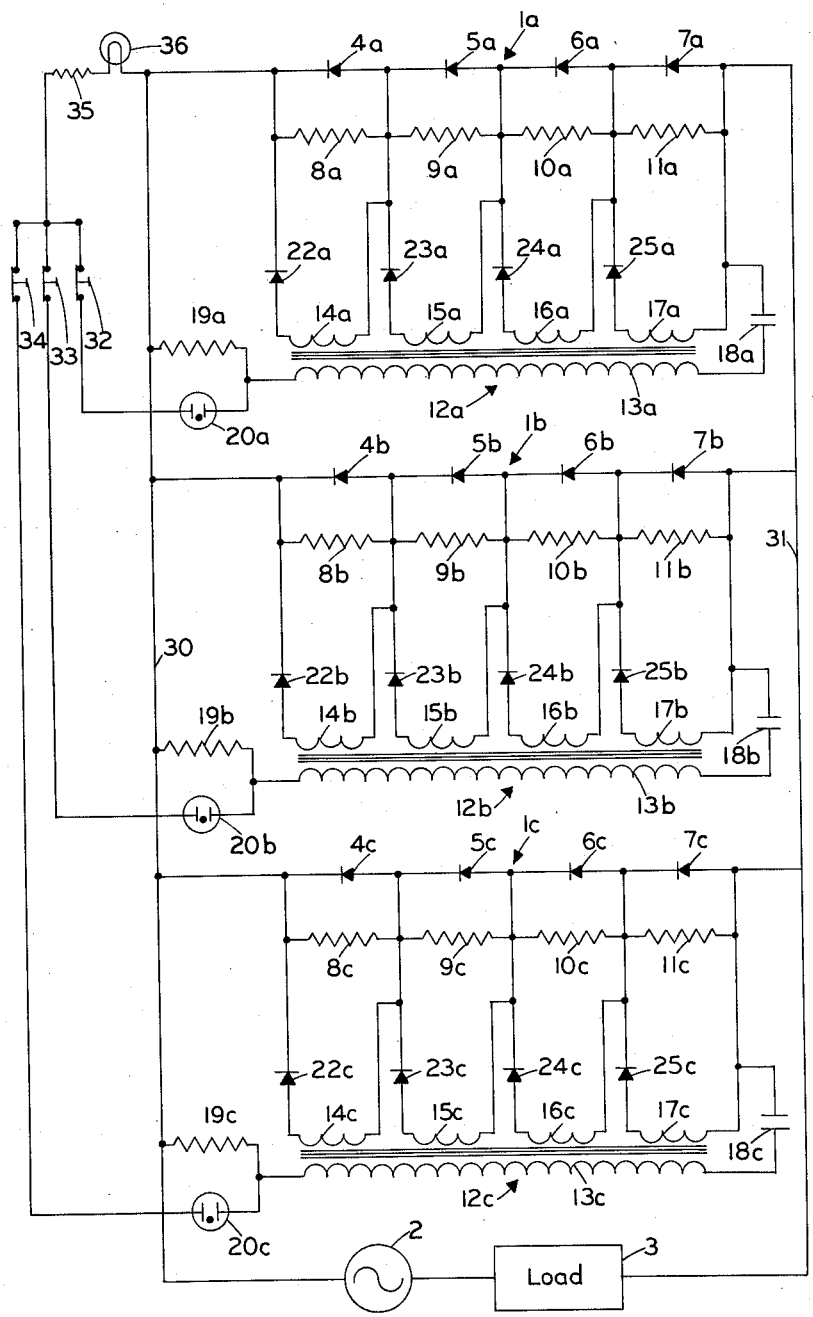
FIGURE 3 is a schematic diagram illustrating a further modification of my invention as applied to a plurality of rectifier legs.

The embodiment shown in FIGURE 3 may be used with a rectifying system, including a rectifier bank comprised of a plurality of rectifier legs, where it is desired that a remote indication of the shorting of a rectifier cell be given. The numbering system used in FIGURES 1 and 2 has been preserved in FIGURE 3 wherein components which are the same as those in the previous figures have the same numerals assigned to them. It may be seen that the essential components associated with each rectifier leg have been renumbered with the letter "a," "b," "c," to indicate that they are similar components to those of the previous figures as they appear in the various rectifier legs of the new embodiment. While I have shown the rectifier bank, in this instance, as comprising only three rectifier legs and their protective circuitry in order to make the drawing more comprehensible, it should be understood that the rectifier bank may include many more legs than are actually shown. The rectifier legs 1a, 1b, and 1c, are connected across the positive and negative buses 30 and 31, respectively, of the rectifier bank. The indicating lamps 20a, 20b, and 20c, are connected through remotely located normally closed switches controlled by push buttons 32, 33, and 34, respectively, to a common resistor 35, a series indicating lamp 36 and back to the positive bus 30. With this configuration, should a rectifier cell fail in one of the rectifier legs the corresponding indicating lamp 20a, 20b, or 20c will fire.

In addition to one of these indicating lamps firing, remote indicating lamp 36 will also be energized to give an indication at a remote point that one of the rectifier cells has failed. In order to determine at the remote station which rectifier leg contains the failed cell, the push buttons 32-34 may be selectively depressed until the remote indicating lamp 36 is de-energized. When the lamp 36 is de-energized, it will be apparent that the rectifier leg containing the failed cell is the one that is in circuit with the push button whose depression effected de-energization of lamp 36. For example, suppose that the lamp 36 is extinguished when the push button 32 is depressed. It will then be known that the failed rectifier cell is located in rectifier leg 1a. It is apparent that in an extremely large rectifier installation, the various rectifier banks may be located over a substantial area. In such a large installation it would be difficult to adequately supervise the many indicating lamps distributed throughout the system and consequently a shorted cell might go undetected for a substantial time. With the remote indication system of this embodiment all of the indicators may be brought to a single panel and adequately supervised by a single person in order to prevent multiple failures upon the failure of a single cell.

While I have shown and described a number of embodiments of my invention, it would be obvious to those skilled in the art that various changes and modifications may be made without departing from my invention in its broader aspects, and I, therefore, aim in the appended claims to cover all changes and modifications as fall within the true spirit and scope of my invention.

What I claim as new and desire to secure by Letters Patent of the United States is:

1. In combination, a plurality of rectifier legs connected in parallel to form a rectifier bank which is subject to a high inverse voltage during the blocking portion of an alternating current cycle, each rectifier leg including a plurality of rectifier cells connected in series; and a plurality of means each connected to a different one of said rectifier legs for detecting the failure of at least one of the rectifier cells therein, each of said means comprising: a transformer having a primary winding connected across the corresponding rectifier leg and a plurality of secondary windings each connected across a corresponding rectifier cell in said corresponding leg, a blocking rectifier in series with each of said secondary windings for normally maintaining said windings in a substantially open circuit condition, and indicating means remote from said legs and connected in series with each of the primary windings of said cell failure detecting means and responsive to a substantial variation in the ratio of the inverse voltage across any one of said legs and the inverse voltage across each of the cells therein for indicating that a rectifier cell has failed, and means for selectively disconnecting said primary windings from said indicating means whereby deactivation of said indicating means is effective to indicate the rectifier leg containing the failed cell.

2. In combination with a rectifier leg having a plurality of rectifier cells connected in series, means for detecting the failure of at least one of said rectifier cells comprising: a transformer having a primary winding connected across said rectifier leg and a plurality of secondary windings, said secondary windings each being connected across a corresponding rectifier cell; a blocking rectifier in series with each of said secondary windings; impedance means and impedance means including an indicating device connected in series with said primary winding to form a series circuit across said rectifier leg, said series circuit providing voltage drops across said primary winding and said indicating means having a predetermined ratio during normal operation of the rectifier leg; each of said secondary windings being responsive to the failure of a rectifier cell for changing the ratio of the voltage drops across the said primary winding and said indicating means to activate said indicating means.

3. In combination with a rectified leg having a plurality of rectifier cells connected in series, means for detecting the failure of at least one of said rectifier cells comprising: a transformer having a primary winding and a plurality of secondary windings, said secondary windings each being connected across a corresponding rectifier cell; a blocking rectifier in series with each of said secondary windings for normally maintaining said windings in a substantially open circuit conditions; and impedance means connected in series with said primary winding to form a series circuit, said circuit being connected across said rectifier leg, and indicating means connected in shunt with said impedance means for responding to changes in the impedance of said primary winding in response to a flow of current in said secondary windings during the blocking half cycle of said rectifier leg.

4. The combination of claim 3 wherein the turns ratio between the primary winding and each of the secondary windings of the transformer is such that the inverse voltage appearing across each rectifier cell exceeds the voltage induced in its corresponding secondary winding during normal operation.

5. The combination of claim 4 wherein said blocking rectifiers are polarized in such a manner that current will flow therethrough only when the voltage induced in a secondary winding exceeds the inverse voltage across its corresponding rectifier cell.

6. The combination of claim 3 wherein each of said rectifier cells is shunted by a balancing resistor for distributing the inverse voltage across the rectifier leg evenly amongst the rectifier cells.

7. In combination with a rectifier leg having a plurality of rectifier cells connected in series, means for detecting the failure of at least one of said rectifier cells comprising: a transformer having a primary winding and a plurality of secondary windings, said secondary windings each being connected across a corresponding rectifier cell; indicating means in series with said primary winding to form a series circuit, said series circuit being connected across said rectifier leg and providing predetermined voltage drops across said primary winding and said indicating means during normal operation of the rectifier leg; a blocking rectifier in series with each of said secondary windings, the shorting of a rectifier cell operating to decrease the voltage drop across said primary winding and correspondingly to increase the voltage drop across said indicating means whereby said voltage drop across said indicating means exceeds the voltage required to actuate said indicating means.

8. In a rectifier bank which is subject to a high inverse voltage during the blocking portion of an alternating current cycle and which includes a plurality of rectifier legs connected in parallel across the rectifier bank, each rectifier leg including a plurality of rectifier cells connected in series, means for detecting the failure of at least one of the rectifier cells in a rectifier leg comprising: a plurality of transformers each having a primary winding and a plurality of secondary windings, said secondary windings of each transformer each being connected across a corresponding rectifier cell in a corresponding rectifier leg; a blocking rectifier in series with each of said secondary windings for normally maintaining said winding in a substantially open circuit condition; and a plurality of indicating means, each in series with its corresponding primary winding to form a series circuit, said series circuit being connected across its corresponding rectifier leg for responding to changes in the impedance of its corresponding primary winding in response to current flow in said corresponding secondary windings during the blocking half cycle of said rectifier bank.

9. The combination of claim 8 which further includes remote indicating means connected in series with the primary winding of each of said transformers to render said remote indicating means dependent upon changes in the impedance of any primary winding for remotely indicating the failure of any rectifier cell.

10. In combination with a rectifier leg having a plurality of rectifier cells connected in series and a balancing resistor connected in parallel with each of said rectifier cells, means for detecting the failure of at least one of said rectifier cells comprising: a transformer having a primary winding and a plurality of secondary windings, said secondary windings each being connected across a corresponding rectifier cell and its corresponding balancing resistor; a resistor connected in series with said primary winding to form a series circuit, said series circuit being connected across said rectifier leg and providing predetermined voltage drops across said primary winding and said series resistor during normal operation of the rectifier leg; indicating means including a neon indicating lamp and a current limiting resistor, said indicating means being shunted across said series resistor, said neon indicating lamp being de-energized during normal operation of said rectifier cells; a blocking rectifier in series with each of said secondary windings for normally maintaining each of said secondary windings in an open circuit condition, each of said blocking rectifiers being polarized in such a manner with respect to its corresponding rectifier cell and secondary winding that current will flow therethrough only when the voltage induced in its corresponding secondary winding exceeds the inverse voltage across its corresponding rectifier cell due to the failure of that rectifier cell, said current flow being effective to decrease the impedance of said transformer primary winding whereby the voltage drop across said series resistor is increased and said neon indicating lamp is energized.

11. In combination with a rectifier leg having a plurality of rectifier cells connected in series, means for detecting the failure of at least one of said rectifier cells comprising: a transformer having a primary winding connected across said rectifier leg and a plurality of secondary windings, said secondary windings each being connected across a corresponding rectifier cell for impressing a voltage across each cell in opposition to the inverse voltage appearing thereon; means for normally maintaining said secondary windings in a substantially open circuit condition and responsive to the failure of a cell to allow current flow through the secondary winding corresponding to the failed cell; and indicating means including an impedance device connected in series with said primary winding and responsive to changes in impedance of said primary winding due to current flow in at least one of said secondary windings for effecting an indication of a failed rectifier cell.

12. In combination with a rectifier leg having a plurality of rectifier cells connected in series, means for detecting the failure of at least one of said rectifier cells comprising: a transformer having a primary winding connected across said rectifier leg and a plurality of secondary windings, said secondary windings each being connected across a corresponding rectifier cell; a blocking rectifier in series with each of said secondary windings for normally maintaining said windings in a substantially open circuit condition; and indicating means connected in series with said primary winding to form a series circuit across said rectifier leg for sensing changes in the impedance of said primary winding in response to a flow of current in said secondary windings during the blocking half cycle of said rectifier leg, said indicating means including a resistor in series with said primary winding and a neon indicating lamp connected across said series resistor.

13. In combination with a rectifier leg having a plurality of rectifier cells connected in series, means for detecting the failure of at least one of said rectifier cells comprising: a transformer having a primary winding connected across said rectifier leg and a plurality of secondary windings, said secondary windings each being connected across a corresponding rectifier cell; a blocking rectifier in series with each of said secondary windings for normally maintaining said windings in a substantially open circuit condition; indicating means connected in series with said primary winding to form a series circuit providing predetermined voltage drops across said primary winding and said indicating means during normal operation of the rectifier leg; the shorting of a rectifier cell operating to decrease the voltage drop across said primary winding and correspondingly to increase the voltage drop across said indicating means whereby said voltage drop across said indicating means exceeds the voltage required to actuate said indicating means, said indicating means including a resistor in series with said primary winding and a neon indicating lamp connected across said series resistor.

14. In combination with a rectifier leg having a plurality of rectifier cells connected in series, a fuse connected in series with said rectifier leg, means for detecting the failure of at least one of said rectifier cells comprising a transformer having a primary winding connected across said rectifier leg and a plurality of secondary windings, said secondary windings each being connected across a corresponding rectifier cell; a blocking rectifier in series with each of said secondary windings for normally maintaining said windings in a substantially open circuit condition, indicating means connected in series with said primary winding and response to changes in impedance of said primary winding due to current flow in at least one of said secondary windings for effecting an indication of a failed rectifier cell; said indicating means having a first branch connected between a terminal of said primary winding and the common terminal of said fuse and leg to effect an indication of a failed rectifier only when said fuse is intact and having a second branch connected between said primary winding terminal and the other terminal of said fuse to effect an indication of a failed rectifier irrespective of the condition of said fuse.

References Cited in the file of this patent
UNITED STATES PATENTS

| | | | |
|---|---|---|---|
| 1,867,419 | Peek | July 12, | 1932 |
| 2,447,658 | Marbury et al. | Aug. 24, | 1948 |
| 2,492,343 | Zavales | Dec. 27, | 1949 |
| 2,568,172 | Spencer | Sept. 18, | 1951 |
| 2,678,418 | Black | May 11, | 1954 |
| 2,917,697 | Diebold | Dec. 15, | 1959 |
| 2,930,961 | Lezan | Mar. 29, | 1960 |